United States Patent [19]

Ferrari Aggradi et al.

[11] Patent Number: 4,593,448

[45] Date of Patent: Jun. 10, 1986

[54] METHOD FOR TIGHTLY JOINTING A SLEEVE TO A SUBMARINE PIPE LAID AT GREAT DEPTH

[75] Inventors: Gian P. Ferrari Aggradi, Barberino di Mugello; Giampaolo Bonfiglioli, Inzago, both of Italy

[73] Assignees: Nuovo Pignone S.p.A., Florence; Snam S.p.A., Milan, both of Italy

[21] Appl. No.: 711,362

[22] Filed: Mar. 13, 1985

[30] Foreign Application Priority Data

Mar. 14, 1984 [IT] Italy ............................. 20046 A/84

[51] Int. Cl.⁴ ............................................. B21D 39/08
[52] U.S. Cl. ....................................... 29/523; 29/446; 29/402.08; 72/58; 138/147; 138/172; 285/382.5
[58] Field of Search ............... 29/523, 421 R, 402.8, 29/446; 72/58, 61; 285/382.4, 382.5; 138/147, 172

[56] References Cited

U.S. PATENT DOCUMENTS

| 1,994,210 | 12/1976 | Chobert | 29/523 |
| 2,468,488 | 4/1949 | Coyle et al. | 29/523 |
| 2,832,503 | 4/1958 | Boumann | 285/382 X |
| 3,997,193 | 12/1976 | Tsuda et al. | 285/382.4 X |

*Primary Examiner*—Mark Rosenbaum
*Assistant Examiner*—Leonard S. Selman
*Attorney, Agent, or Firm*—Birch, Stewart, Kolasch & Birch

[57] ABSTRACT

Method for tightly jointing a sleeve to a submarine pipe laid on a very deep sea-bottom, characterized by the preliminary stages of providing a series of grooves on the inside surface of the sleeve, and of filling each one of said grooves with two half-rings made of a material collapsible under high pressures up to a 70% variation of its volume. A type of such a material is moreover described.

2 Claims, 3 Drawing Figures 4,593,448

METHOD FOR TIGHTLY JOINTING A SLEEVE TO A SUBMARINE PIPE LAID AT GREAT DEPTH

BACKGROUND OF THE INVENTION

1. Field of the Invention

The present invention relates to a novel method allowing a more effective and cheap tight jointing between a sleeve and a submarine pipe laid at a great depth. More specifically, the invention relates to an improvement to the method already disclosed in our prior U.S. Pat. No. 4,388,752 granted on June 21, 1983.

2. Description of Background Art

It is known that, according to the method of said U.S. Pat. No. 4,388, 752 the tight fastening of a cylindrical sleeve of constant cross-section area to a steel pipe comprises the successive steps of inserting inside the overlapped pipe-sleeve assembly a particular plug expander of hard rubber, of axially compressing said plug in order to radially expand said pipe-sleeve assembly up to the limit of elastic strain of the material constituting the sleeve, which is higher than that of the pipe, and of decompressing and extracting said plug from said pipe.

It is clear now that if it were possible to adopt, instead of a cylindrical sleeve of constant cross-section area, a cylindrical sleeve having its inner surface shaped with a series of grooves and of toothings, the double result of a more effective and cheap tight joining between the sleeve and the pipe would be accomplished.

In fact, during the said radial expansion the pipe would penetrate into the grooves of the sleeve, and would hence remain fastened to this latter, thus considerably enhancing the resistance to the axial thrusts, which in the case of a cylindrical sleeve with constant section is entrusted to friction only.

On the other hand, whilst in the case of the cylindrical sleeve with constant cross section area the pipe must be submitted to mechanical machining before the jointing, in order to remove the outer longitudinal welding bead, whose presence would compromise the tightness. In the case of the sleeve provided with a toothing this would not occur, in that the outer welding bead would get squashed against the edge of the teeth: the mechanical turning of the submarine pipe would thus be avoided, which is very difficult to be done in the case of very great depths and would require a long time and high expenses.

Unfortunately, in the high depth submarine applications, the adoption is made impossible by the high pressure of the water present in the slots, which prevents the pipe from expanding into said slots.

A method which would allow a cylindrical sleeve of not constant cross section area to be adopted could consists in providing holes in correspondence of the slots of the sleeve, in order to allow the outflow of the water during the expansion of the pipe, but such a solution would weaken the sleeve and consequently would considerably decrease the tightness safety.

SUMMARY AND OBJECTS OF THE INVENTION

Purpose of the present invention is precisely to obviate the drawbacks, and hence to supply a method allowing to tightly joint on to a pipe a cylindrical sleeve whose inside surface is provided with grooves.

This is substantially accomplished by the fact that each groove of the sleeve is preliminarly filled with two half-rings of a material which, while being practically indeformable, or only negligibly deformable under normal pressures, collapses under high pressures of the order of 300 kg/cm$^2$, with a drastic reduction of its volume, higher than 70%.

In such a way indeed, as the operating pressure in the step of pipe-to-sleeve coupling is of the order of 1,000 kg/cm$^2$, the two half-rings filling each groove collapse, become more compact notably decreasing in volume and form a hollow hence the expansion of the pipe into the grooves.

Thus, the method for tightly joining a sleeve to a submarine pipe laid at great depth, comprising the successive steps of mounting the sleeve on the free end of said pipe, of inserting a particular plug expander of hard rubber inside the pipe-sleeve assembly, of axially compressing and continuing to axially compress said plug in order to radially expanding the pipe-sleeve assembly up to the limit of elastic deformation of the material constituting the sleeve, which is greater than that of the pipe, and of decompressing and extracting said plug from said pipe, is characterized, according to the present invention, by the preliminary steps of shaping the inner surface of the sleeve with a sequence of grooves and of toothings, as well as of filling each groove of the sleeve with two half-rings made with a material which is practically indeformable or deformable to a practically negligible extent under normal pressures, but collapses with a drastic reduction, greater than 70%, of its volume, under high pressures of the order of 300 kg/cm$^2$.

Now, the use according to the invention of a sleeve provided with a toothing involves a machining of the inner surface of said sleeve, but said machining is clearly easy and not very expensive in that, to the contrary of the operation of mechanical turning of the submarine pipe, it can be comfortably carried out at the surface, within premises equipped with suitable means.

According to a further feature of the present invention, the material collapsible under high pressures, from which the said sleeve groove filling half-rings are made, is constituted by glass micro- and macrospheres, which are compacted together by an epoxy resin.

It is substantially the cavity voluem of said spheres and in particular of said macrospheres, which, when the material collapses, allows the large volume reduction.

It is then clear that by using such a material, any shapes and dimensions can be accomplished, by using moulds within which the spheres and the epoxy resin are poured before hardening. Moreover, the characteristics of the material can be easily changed as a function of the installation pressure and of the collapse pressure required, by simply changing the type of epoxy resin, the size of the glass spheres, and the percentage by number of the micro- and of the macrospheres.

BRIEF DESCRIPTION OF THE DRAWINGS

The invention is now clarified to a greater extent with reference to the attached drawing, illustrating a preferred embodiment of the invention, shown to exemplifying purposes only, and not to limitative purposes, in that it will be always possible to introduce technical, technological and structural changes within the spirit of the present invention.

In said drawing.

DETAILED DESCRIPTION OF THE PREFERRED EMBODIMENT

Referring to the figures, a sleeve is to be tightly jointed to a submarine pipe 2 laid at a great depth.

Figure 1:
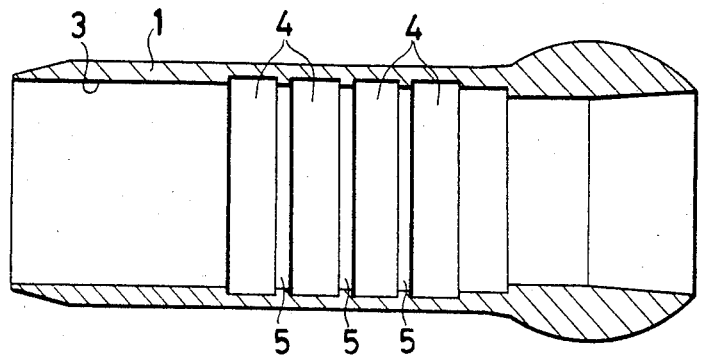
FIG. 1 shows a sectional view of a sleeve according to the invention.
Figure 2:
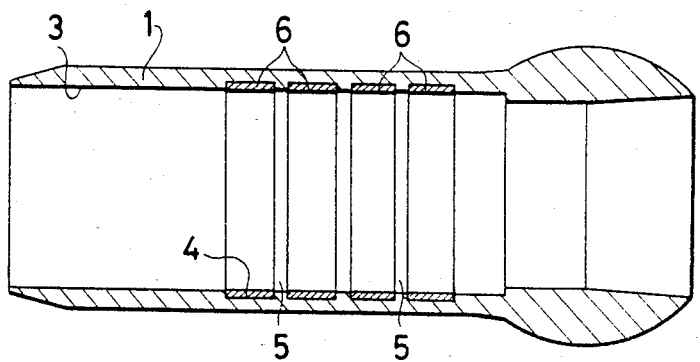
FIG. 2 shows a sectional view of the sleeve of FIG. 1, wherein the grooves are filled with half-rings always according to the invention.

To that purpose, on the inner surface 3 of said sleeve made of material having an elastic deformation limit greater than that of the material from which the pipe 2 is made, a set of grooves 4 and of toothings 5 is provided, and each groove 4 is subsequently filled with two half-rings 6 (see specifically FIG. 2, wherein only a half-ring per each groove is visualized, the other half-ring being positioned so as to face the first one).

Said half-rings 6 are made from a material constituted by internally hollow glass micro- and macrospheres, which are compacted with each other by means of an epoxy resin poured into a mould having the shape of a half-ring.

Figure 3:
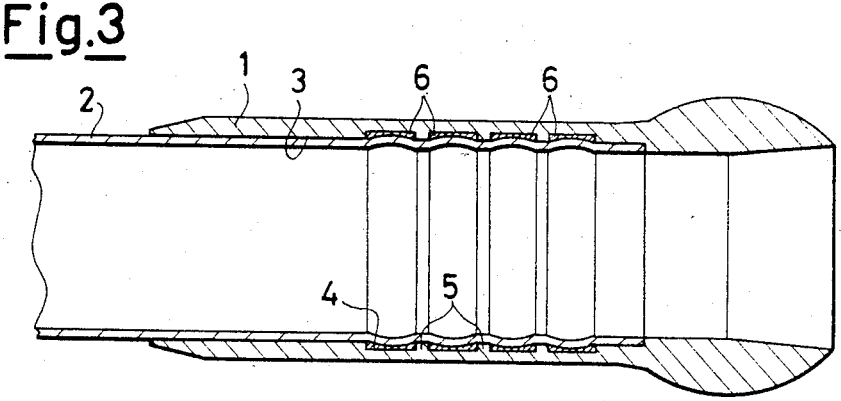
FIG. 3 shows a sectional view of the sleeve of FIG. 1 jointed to a pipe according to the method of the present invention.

The so-prepared sleeve is then lowered down onto the very deep sea-bottom and mounted on the free end of said submarine pipe 2. The pipe-sleeve assembly is then radially expanded, by means of a particular expander inserted inside said assembly, up to the elastic deformation limit of the material constituting said sleeve 1, so that the pipe 2 is plastically deformed into the grooves 4 of the sleeve 1 (see FIG. 3), this being possible in that the half-rings 6, by collapsing due to the high-pressure conditions, reduce their volume by a considerable extent.

At last, the expander is de-energized and removed, so that the elastic recovery of the sleeve creates the desired tight seal with the underlying pipe 2.

We claim:

1. Method for tightly jointing a sleeve to a submarine pipe laid at great depth, comprising the successive steps of mounting the sleeve on the free end of said pipe, of inserting a particular plug expander of hard rubber inside the pipe-sleeve assembly, of axially compressing and continuing to axially compress said plug in order to radially expanding the said pipe-sleeve assembly up to the limit of elastic deformation of the material constituting the sleeve, which is greater than that of the pipe, and of decompressing and extracting said plug from said pipe, characterized in that it comprises also the preliminary steps of shaping the inner surface of the sleeve with a sequence of grooves and of toothings, as well as of fitting each groove of the sleeve with two half-rings made with a material which is practically indeformable or deformable to a practically negligible extent under normal pressures, but collapses with a drastic reduction, greater than 70%, of its volume, under high pressures of the order of 300 kg/cm$^2$.

2. Method according to claim 1, characterized in that said material collapsible under high pressures, from which said sleeve groove filling half-rings are made, is constituted by internally hollow glass micro- and macrospheres, which are compacted together by an epoxy resin.

* * * * *